United States Patent
Matsumoto

[11] Patent Number: 6,117,512
[45] Date of Patent: Sep. 12, 2000

[54] OPTICAL INFORMATION MEDIUM AND MANUFACTURING METHOD THEREFOR

[75] Inventor: Takanobu Matsumoto, Tokyo, Japan

[73] Assignee: Taiyo Yuden Co., Ltd., Tokyo, Japan

[21] Appl. No.: 09/168,816

[22] Filed: Oct. 8, 1998

[30] Foreign Application Priority Data

Oct. 31, 1997 [JP] Japan ..................... 9-316557

[51] Int. Cl.[7] ..................... B32B 3/00
[52] U.S. Cl. ............ 428/64.1; 428/64.2; 428/64.4; 428/64.8; 428/457; 428/913; 430/270.14; 430/495.1; 430/945; 369/283; 369/288
[58] Field of Search ............ 428/64.1, 64.2, 428/64.4, 64.7, 64.8, 457, 913; 430/270.14, 495.1, 945; 369/283, 288

[56] References Cited

U.S. PATENT DOCUMENTS 5,573,831 11/1996 Suzuki et al. ............ 428/64.1
5,705,247 1/1998 Arai et al. ............ 428/64.1

FOREIGN PATENT DOCUMENTS 0 548 968 6/1993 European Pat. Off. .
0 603 779 6/1994 European Pat. Off. .
0 628 956 12/1994 European Pat. Off. .
0 652 555 5/1995 European Pat. Off. .
0 847 050 6/1998 European Pat. Off. .

*Primary Examiner*—Elizabeth Evans
*Attorney, Agent, or Firm*—Flynn, Thiel, Boutell & Tanis, P.C.

[57] ABSTRACT

An optical information mediumis made up of a transparent substrate, on which are formed a dye recording layer of at least one dyestuff, a reflective layer of metal, and a protective layer in sequence, wherein said protective layer is formed from a plurality layers of resin which are formed sequentially. Further, the reflective layer is made of silver, and the dye recording layer is made of a material which does not contain iodine ion. The protective layer contains a material for trapping molecules and/or ions which corrode the reflective layer. For instance, a metal powder or porous pigment is contained in the protective layer, which is active on or absorbs the molecules and/or ions corroding the reflective layer.

5 Claims, 2 Drawing Sheets

OPTICAL INFORMATION MEDIUM AND MANUFACTURING METHOD THEREFOR

BACKGROUND OF THE INVENTION

1. Field of the Invention

The present invention relates to an optical information medium having a recording layer made of a dyestuff or coloring matter, such as a recordable CD (compact disk), i.e., so-called a CD-R, and in particular relates to an optical information medium provided with the dye recording layer, a reflective layer and a protective layer, one by one on a transparent substrate.

2. Description of Related Art

A disk of a single-plate type in conformity with an orange book, i.e., a CD-R, has, as shown for example in FIG. 3, a transparent substrate 1 of polycarbonate in the shape of a disk, having a center hole (not shown in FIG. 3), on which is provided a dye recording layer 2 of an organic dyestuff such as a cyanine dye or the like. On the dye recording layer 2 is provided a reflective layer 3 of a metal film, and further on the reflective layer 3 is provided a protective layer 4 of a UV (ultraviolet) curable resin. On a main surface of the above transparent substrate 1, there is formed a guide groove 6 in a spiral shape as a tracking means, and the dye recording layer 2 is formed on the main surface having such the guide groove 6.

Conventionally, with an optical information medium having the dye recording layer 2, such as the CD-R mentioned above, it is common to use a film of gold as the reflective layer 3.

For the purpose of cost reduction of such an optical information medium having the dye recording layer 2, such as the CD-R mentioned above, it has been studied to apply a film of silver as the reflective layer 3 other than a gold film. However, silver is inferior in chemical stability to gold, therefore, there is a problem of corrosion due to hydrogen sulfide and so on during the long-term use thereof.

As mentioned above, the protective layer 4 of the UV curable resin, which is provided on the reflective layer 3, is effective to protect it against shock or impact and to prevent the reflective layer 3 from damage thereon. However, it is not necessarily effective in preventing corrosive molecules and/or ions of such as hydrogen sulfide and so on from penetration when used as a barrier for protecting the reflective layer 3 from the corrosion thereof. This is mainly because the UV curable resin forming the protective layer does not fully show a perfect airtight property, therefore, the corrosive molecules and/or ions penetrate therethrough, as well as, it is conceivable that the corrosive molecules and/or ions penetrate into a side of the reflective layer 3 through defects 7, such as minute concave or pin-holes which are caused when the protective layer 4 is formed. Further, forming the reflective layer 2 with silver showing a higher chemical activity, the dyestuff of the dye recording layer 2 easily reacts with the silver of the reflective layer 3, therefore, the reflective layer 2 and the reflective layer 3 easily deteriorate.

SUMMARY OF THE INVENTION

An object, in accordance with the present invention, for the problem in weather resistance of the reflective layer when it is formed with the silver film, in particular, the reflective layer of the optical information medium having a dye recording layer, such as the CD-R, is to provide an optical information medium having a reflective layer which shows a stability for a long time, thereby providing an optical information medium able to be used for a long term.

According to the present invention, for achieving the object mentioned above, while a reflective layer 3 is formed with a silver film, a protective layer 4 is formed with a plurality of layers 4a, 4b of resin which are formed separately and sequentially, and further, the protective layer 4 formed with those resin layers 4a, 4b contains a material which traps molecules and/or ions which corrode the reflective layer 3. Thereby, the corrosive molecules and/or ions will not reach the reflective layer 3 of the silver film.

Namely, an optical information medium, for achieving the object mentioned above, comprises a transparent substrate 1, on which are formed a dye recording layer 2 of at least one dyestuff, a reflective layer 3 of metal, and a protective layer 4, in sequence. Here, it is characterized in that said protective layer 4 comprises a plurality layers 4a, 4b of resin which are formed sequentially. Further, said reflective layer 3 is made of silver or an alloy mainly containing silver.

In such an optical information medium, since the protective layer 4 is formed with the plural resin layers 4a, 4b which are formed separately and sequentially, then, even if the concave and/or pin-holes occur in the resin layers 4a, 4b, those defects are filled up with other resin films 4a, 4b, as a result, the defects never communicate between outside air and the reflective layer 3. Thereby, the probability that the corrosive molecules and/or ions of the outside air reaching the reflective layer 3 of the silver film is greatly reduced in comparison with that in the conventional arts. Accordingly, the corrosion of the reflective layer 3 hardly occurs.

Further, according to experiments made by the inventors of the present invention, it is found that the reaction between the dyestuff material for forming the dye recording layer 2 and the silver forming the reflective layer 3 accelerates in the presence of ions of iodine. Therefore, it is preferable that the iodine ion contained in the dye recording layer 2 is equal to or less than 1,000 ppm in weight %. More preferably, the iodine ion in the dye recording layer 2 is equal to or less than 100 ppm in weight %.

Moreover, it is preferable that the protective layer 4 contains material for trapping molecules and/or ions which corrode the reflective layer 3. For example, metal particles for reacting with the molecules and/or ions which corrode the reflective layer 3, or porous pigments for absorbing the molecules and/or ions which corrode the reflective layer 3 are contained in the protective layer 4, thereby, the corrosive molecules and/or ions trying to enter into the reflective layer 3 through the protective layer 4 are trapped within the protective layer 4.

For those reasons, with the optical information medium according to the present invention, if the reflective layer is formed of a silver film, the reflective layer 3 hardly deteriorates, even in an atmosphere including the corrosive molecules and/or ions. Accordingly, it is possible to obtain an optical information medium which is usable or practicable for a long time with stability, while achieving the cost reduction thereof, in particular, the cost of the metal material for forming the reflective layer 3.

DESCRIPTION OF THE PREFERRED EMBODIMENTS

Hereinafter, detailed explanation of the embodiments according to the present invention will be given by referring to the attached drawings.

Figure 1:
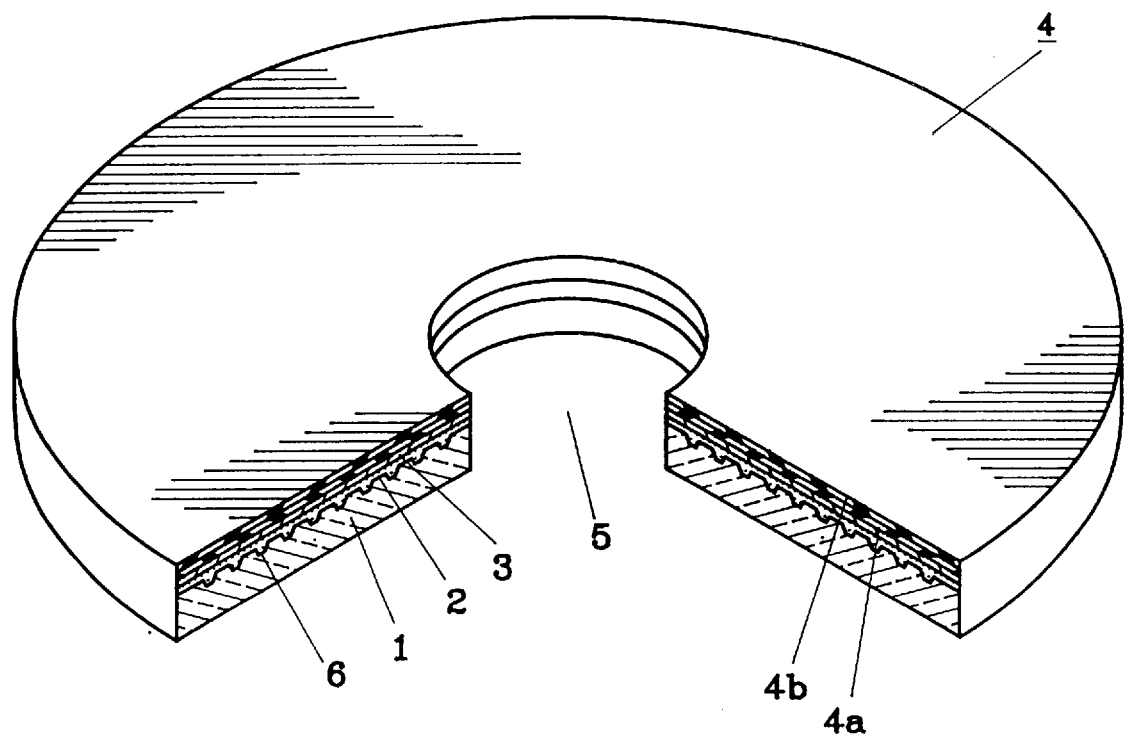
FIG. 1 is a perspective view of an embodiment showing an optical information medium according to the present invention, including partial cross-section thereof.
Figure 2:
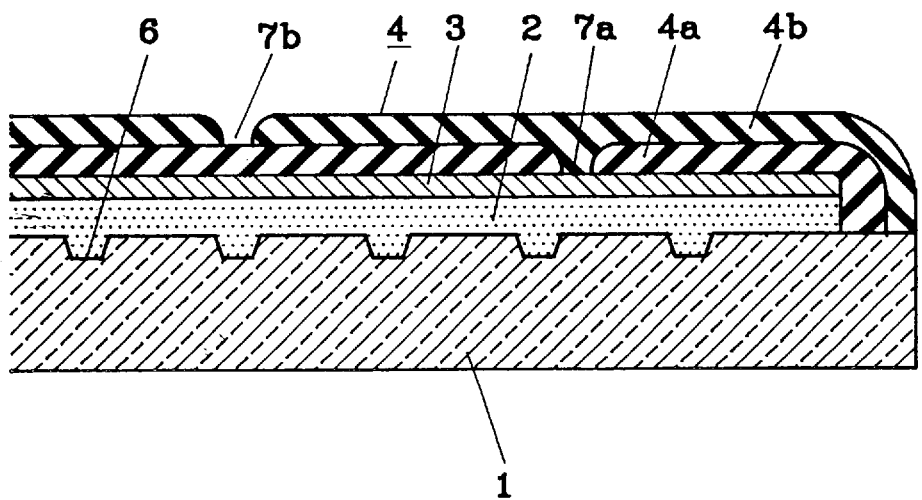
FIG. 2 is a diagrammatic vertical cross-section view showing a substantial portion of the above optical information medium.
Figure 3:
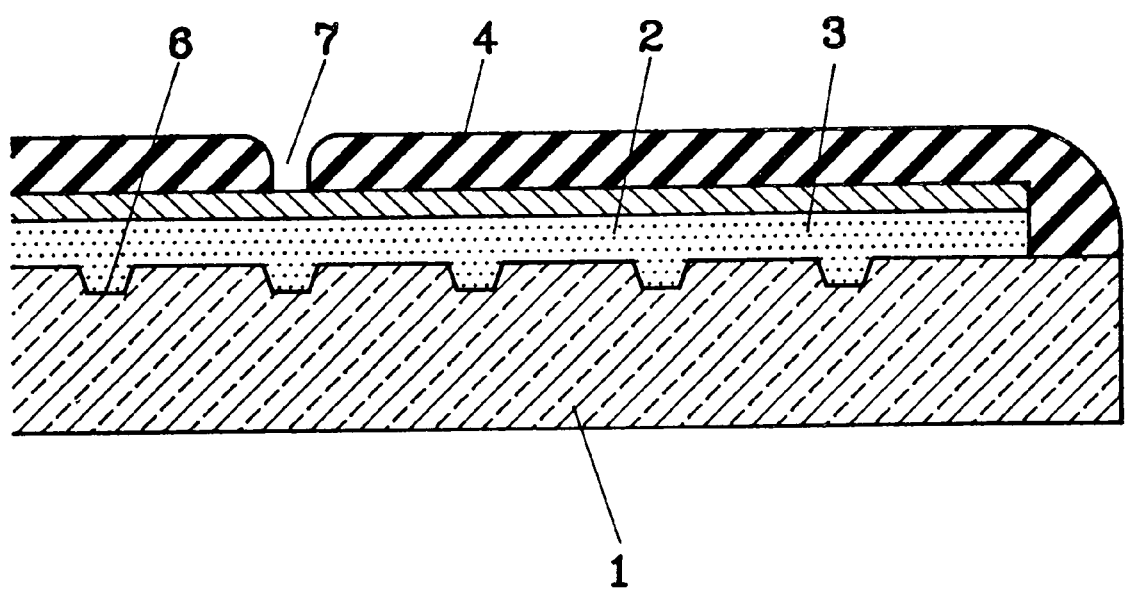
FIG. 3 is a diagrammatic vertical cross-section view showing a substantial portion of a conventional optical information medium.

FIG. 1 shows the view of a CD-R, as an optical information medium, from a reverse surface side of a surface upon which a reproducing light beam is incident, wherein a transparent substrate 1 is shown in a lower portion of the same figure. Further, FIG. 2 shows the diagrammatic view of the section of the CD-R mentioned above.

On the surface of a transparent substrate 1 of polycarbonate resin and so on, a guide groove 6 for use in tracking is formed in a spiral shape, and further on it is formed a dye recording layer 2 of a cyanine dye or the like. On the dye recording layer 2, there is formed a reflective layer 3 of silver or an alloy mainly containing silver, and further on it is formed a protective layer 4 of a UV curable resin. The protective layer 4 is formed with a plurality of resin films 4a, 4b which are formed separately and sequentially to each other. In the embodiment shown in the figure, they are constructed with two (2) layers of the resin films 4a, 4b.

For the transparent substrate 1 in a shape of a plate for use in the optical information medium, a resin material is used which has a high transparency and a refractive index within a range from 1.4 to 1.5 with respect to a laser beam, and has a superior resistance against impact or shock. In more detail, a polycarbonate, polyolefin, and acryl can be listed for it, for instance, however, it should not be restricted only to those mentioned.

The transparent substrate 1 is formed, for instance, by using resin materials and by means of an injection molding, etc. Upon the surface of the transparent substrate 1 is formed the guide groove 6 of the spiral shape, however, it can be substituted with a means of another shape or configuration for use in the tracking guide. Such a tracking guide means can be formed by use of a stamper, in general, through a conventional method.

The dye recording layer 2 is formed through spin coating of an organic dyestuff, such as a cyanine dye or the like, on a main surface of the transparent substrate 1 on which the tracking means as mentioned is formed and thereafter drying it. In this case, the organic dyestuff which is used contains iodine anion at a weight % equal to or less than 1,000 ppm.

The reflective layer 3 is formed through forming the silver film on the organic dyestuff layer 13. In more detail, the silver film is coated by means of a vacuum evaporation method or a sputtering method, thereby forming the reflective layer 3 of the metal film.

The optical information medium comprises a portion, in which the information which is optically readable through the laser beam is recorded, and this means, for instance, a layer from and into which the information is reproduced and recorded optically by irradiating the laser beam thereon, or a surface of the substrate or other surface(s) thereof relating to the recording and reproducing of the information. For example, in the case of the above-mentioned optical information medium which is shown in FIGS. 1 and 2, the recording and reproduction of the information is possible by means of the dye recording layer 2 which is formed on the transparent substrate 1 and the reflective layer 3 which is formed thereon.

The method for recording and/or reproduction is an optical one, and it is in general by use of a laser beam. Such a recording and/or reproduction is conducted from one side surface of the optical information medium, and in more detail, by means of irradiating the laser beam on the surface of the transparent substrate 1 and so on. However, no optical recording and/or reproduction of the information is conducted from the other surface thereof.

In the case where the laser beam is used as a light for recording and reproducing, it is common to use a laser beam having a wavelength of from 770 to 830 nm, however, it is also possible to use a laser beam having a wavelength other than that.

Further, it is also possible to provide a layer other than the dye recording layer 2 and the reflective layer 3 which are shown in FIG. 2. For example, a layer for improving the bonding property can be provided for the purpose of increasing the reliability, other than recording of the information. Also in FIG. 2, the dye recording layer 2 is coated and adhered on the transparent substrate 1 directly, however, there can be a case where another layer is provided therebetween.

The protective layer 4 is a layer for protecting the information recording portion from physical and mechanical obstruction received from a side opposing the transparent substrate 1, therefore, it is provided at the side opposite to the transparent substrate 1.

As mentioned previously, the protective layer 4 is formed with a plurality of resin layers 4a, 4b which are formed separately and sequentially. Here, separately and sequentially means that, after a solid resin layer 4a is formed by applying the resin material and then curing it, a separate resin layer 4b is formed on it. In more detail, the UV curable resin is applied on the surface of the reflective layer 3 or on the other layer formed thereon by means of spin coating, and then an Ultraviolet (UV) ray is irradiated thereon to cure it. After being formed on the resin layer 4a, the other resin layer 4b is formed on the resin layer 4a in the same manner. In the embodiment shown in the figure, the resin layer is of two (2) layers 4a, 4b, however, the protective layer can be formed of more than the two resin layers 4a, 4b.

The thickness is several pm for each of the resin layers 4a, 4b, and that of the protective layer as a whole is from 10 to 20 $\mu$m. It is preferable to mix a material as an additive, which easily reacts with the corrosive molecules and/or ions, such as hydrogen sulfide and sulfur dioxide, into the resin layers 4a, 4b forming the protective layer 4. As the additive, for example, metal particles, in particular, particles of silver are added into the resin material. Thereby are trapped the corrosive molecules and/or ions mentioned above, trying to penetrate through the protective layer 4 into the reflective layer 3, therefore, it is possible to inhibit them from reaching the reflective layer 3.

The amount of addition of the material showing a reactive property with the corrosive molecules and/or ions mentioned above, with respect to that of the resin material, is, for example, in a range from 1 to 50 weight % to the total weight of the resin material and the additive. This is because, if it is less than 1 weight % in the addition amount, it is ineffective in trapping the corrosive molecules and/or ions. While, if exceeding 50 weight % in the addition amount, it loses its property of fluidity as a resin paint, thereby making it difficult to form the resin layers 4a, 4b therewith. The particles of the additive is equal to or less than 10 $\mu$m in the diameter thereof.

It is possible to add such an additive only into the resin layer 4b at the surface side, but it is more effective to add it into all of the resin layers 4a, 4b forming the protective layer 4.

Further, in place of the material having the property of reacting with the corrosive molecules and/or ions, it is also possible to add into the protective layer 4 a material which shows a property of absorbing the corrosive molecules and/or ions. For that purpose, there can be listed a porous inorganic pigment powder made of, e.g., silica, activated carbon (charcoal), talc, mica, calcium carbonate, titanium oxide, zinc white (or zinc flower), colloidal silica, carbon black, Indian red, and so on.

The amount of addition of the material showing the property of absorbing the corrosive molecules and/or ions as mentioned above, with respect to that of the resin material, is in a range from 2 to 20 weight % to the total weight of the resin material and the additive, for example. This is because, if it is less than 2 weight % in the addition amount, it is inadequate in the effect of trapping the corrosive molecules and/or ions. While, if exceeding 20 weight % in the addition amount, it loses its property of fluidity as the resin paint, thereby making it difficult to form the resin layers 4a, 4b therewith. The particles of the additive are equal to or less than 10 μm in the diameter thereof.

It is also possible to add the additive only into the resin layer 4b at the surface side, however, it is more effective to add it into all of the resin layers 4a, 4b forming the protective layer 4.

As mentioned previously, since the protective layer 4 is formed with the plurality of resin layers 4a, 4b, even if defects 7a and 7b, such as a pin hole or the like, are caused in the lower resin layer 4a and the upper resin layer 4b, as shown in FIG. 2 for instance, those defects 7a and 7b are filled up with the other resin layer 4a, 4b as far as they are located differently to each other. As a result of this, the surface of the reflective layer 3 is sealed from outside air. Further, by mixing the additive for trapping the corrosive molecules and/or ions into the resin layers 4a, 4b, those molecules and/or ions are trapped in the protective layer 4, and do not reach the reflective layer 3.

The protective layer 4 is preferably made of a resin having a superior shock or impact resistance. For instance, the hardness of the protective layer 4 is preferably within a range from 2H to 7H/Grass of the hardness of lead of a pencil, for example. Further, it is preferable that the thermal deformation temperature of it is equal to or higher than 80° C., and more preferably equal to or higher than 100° C. With respect to the thickness of the protective layer 4, it is preferably within a range from 10 to 20 μm, and it can be formed with the plurality of layers of materials being different from each other.

Next, examples and a comparison will be explained by showing specific values thereof.

EXAMPLE 1

On the transparent substrate 1 of the polycarbonate, formed with the guide groove 6, a solution of the cyanine dye was applied through spin coating and was cured so as to form the dye recording layer 2. However, the solution of the cyanine dye was used here in which the iodine anion is not included. On the surface of the dye recording layer 2 was sputtered the silver to form the reflective layer 3. Further, on the reflective layer 3, the UV curable resin was applied through spin coating, and it was optically cured by irradiating the UV ray thereon, thereby forming a transparent first resin layer 4a of a thickness of 5 μm. After the first resin layer 4a was cured, the UV curable resin was also applied through spin coating on the first protective layer 4a and was optically cured by irradiating the UV ray thereon, thereby forming a transparent second resin layer 4b of a thickness of 5 μm.

Among five-hundred (500) units of optical information mediums made in such manner, eighty (80) units of them were sampled at random, and further among of those, twenty (20) units of them were measured with a block error rate (BLER) thereof. An average value of those results is shown in the column 0 hour in Table 1.

Further, sixty (60) units of the sampled optical information mediums were disposed under a gaseous atmosphere in which hydrogen sulfide of 10 ppm was mixed into a vaporous atmosphere of a humidity of 95% and a temperature at 70° C. Twenty (20) units of them were picked up every time after 50 hours, 100 hours and 500 hours after starting the disposal thereof, and were measured with the block error rate (BLER) thereof, in the same manner mentioned above. The average values of those results are shown in the columns 50 hour, 100 hour and 500 hour in Table 1, respectively.

EXAMPLE 2

Optical information mediums were made or prepared in the same manner as Example 1 mentioned above, except that a solution of the UV curable resin was used, into which silica powder equal to or less than 10 μm in the diameter thereof was mixed and dispersed, when forming the second resin layer 4b. However, the addition amount of the silica powder to the total weight of the silica powder and the UV curable resin was 20 weight %.

Among five-hundred (500) units of those optical information mediums made in such manner, eighty (80) units of them were sampled at random, and they were tested under an atmospheric condition identical to that mentioned above and were measured with the block error rate (BLER) thereof, at every time after starting the disposal thereof. The average values of those results are shown in each column of times in Table 1, respectively. Here, 0 hour means the block error rate (BLER) which is measured without conducting the atmospheric test.

EXAMPLE 3

Optical information mediums were made or prepared in the same manner as Example 1 mentioned above, except that the second resin layer 4b was formed by applying a hydrophilic UV curable resin ink (hydrophilic UV curable resin ink for printing labels), into which silver powder equal to or less than 10 μm in diameter thereof was mixed and dispersed, through a screen printing and cured with the UV ray. Here, the addition amount of the silver powder to the total weight of the silver powder and the UV curable resin was 20 weight %.

Among five-hundred (500) units of those optical information mediums made in such manner, eighty (80) units of them were sampled at random, and they were tested under an atmospheric condition identical to that mentioned above and measured with the block error rate (BLER) thereof at every time after starting the disposal thereof. The average values of those results are shown in the column of times in Table 1, respectively. Here, 0 hour means the block error rate (BLER) which is measured without conducting the atmospheric test.

Comparison

Optical information mediums were made or prepared in the same manner as Example 1 mentioned above, except that the protective layer 4 having a thickness of 10 μm was formed at one time, instead of forming the first resin layer 4a and the second resin layer 4b separately, and that a solution was used which contained the iodine anion in an amount of 5 weight % as the cyanine dye therein.

Among five-hundred (500) units of those optical information mediums made in such manner, eighty (80) units of them were sampled at random, and they were tested under an atmospheric condition identical to that mentioned above and were measured with the block error rate (BLER) thereof, at every time after starting the disposal thereof. The average values of those results are shown in each column of times in Table 1, respectively. Here, 0 hour means the block error rate (BLER) which was measured without conducting the atmospheric test.

TABLE 1

| Test Hour(s) | Embodiment 1 | Embodiment 2 | Embodiment 3 | Comparison |
|---|---|---|---|---|
| 0 hour | 1 cps | 1 cps | 1 cps | 1 cps |
| 50 hours | 9 cps | 1 cps | 1 cps | 30 cps |
| 100 hours | 80 cps | 1 cps | 1 cps | 200 cps |
| 500 hours | 300 cps | 1 cps | 1 cps | 900 cps |

As is apparent from the results mentioned above, with the optical information medium, in which the protective layer 4 was formed of two layers of the resin layers 4a, 4b, in comparison with the optical information medium which had the protective layer formed from a single resin layer, the increase in the block error rate was small or almost zero, when it was disposed in an atmosphere of hydrogen sulfide under a high temperature and high humidity. This is mainly because of the deterioration in signal characteristics due to the corrosion by the hydrogen sulfide in the reflective layer 3 of the silver film. Further, with Example 2 and Example 3 in which the additives for trapping the hydrogen sulfide were added into the protective layer 4, almost no increase could be recognized in the block error rate thereof, when the optical information medium was disposed in an atmosphere of hydrogen sulfide under a high temperature and high humidity.

What is claimed is:

1. An optical information medium comprising a transparent substrate and a dye recording layer containing at least one dyestuff, a metal reflective layer and a protective layer comprising a plurality of resin layers formed sequentially on said substrate, wherein said protective layer comprises particles of metal for trapping molecules and/or ions which corrode the reflective layer.

2. The optical information medium of claim 1, wherein the reflective layer is made of silver or an alloy mainly containing silver.

3. The optical information medium of claim 1, wherein the dye recording layer contains no more than 1,000 ppm wt. % iodine ion.

4. The optical information medium of claim 1, wherein the protective layer additionally comprises a porous pigment.

5. A method of manufacturing an optical information recording medium comprising the steps of providing a transparent substrate and forming sequentially a dye recording layer containing at least one dyestuff, a metal reflective layer and a protective layer comprising a plurality of resin layers on said substrate, wherein said protective layer comprises particles of metal for trapping molecules and/or ions which corrode the reflective layer.

* * * * *